United States Patent
Hom et al.

(10) Patent No.: US 9,219,706 B2
(45) Date of Patent: *Dec. 22, 2015

(54) JUST-IN-TIME WRAPPER SYNCHRONIZATION

(75) Inventors: Richard V. Hom, Troy, MI (US); Eric M. Nelson, Durham, NC (US); James C. North, Virginia Beach, VA (US)

(73) Assignee: International Business Machines Corporation, Armonk, NY (US)

(*) Notice: Subject to any disclaimer, the term of this patent is extended or adjusted under 35 U.S.C. 154(b) by 414 days.

This patent is subject to a terminal disclaimer.

(21) Appl. No.: 12/893,437

(22) Filed: Sep. 29, 2010

(65) Prior Publication Data

US 2012/0079077 A1  Mar. 29, 2012

(51) Int. Cl.
| | |
|---|---|
| *G06F 15/16* | (2006.01) |
| *H04L 29/12* | (2006.01) |
| *G06F 12/12* | (2006.01) |
| *H04L 29/08* | (2006.01) |

(52) U.S. Cl.
CPC .......... *H04L 61/1523* (2013.01); *G06F 12/121* (2013.01); *H04L 67/2842* (2013.01)

(58) Field of Classification Search
USPC .............. 709/219, 230, 231, 223, 201–206, 709/225–227, 246; 707/694, 769, 610, 740, 707/781, E17.005, E17.014; 706/47; 711/103, 133, 141, 130; 719/320; 726/2–7, 21; 717/101–102
See application file for complete search history.

(56) References Cited

U.S. PATENT DOCUMENTS

| | | | |
|---|---|---|---|
| 6,173,311 B1 * | 1/2001 | Hassett et al. | 709/202 |
| 6,523,027 B1 | 2/2003 | Underwood | |
| 6,615,253 B1 | 9/2003 | Bowman-Amuah | |
| 6,901,410 B2 | 5/2005 | Marron et al. | |
| 7,698,323 B1 | 4/2010 | Rangan et al. | |
| 7,840,588 B2 | 11/2010 | Bell et al. | |
| 8,145,666 B2 | 3/2012 | Bell et al. | |
| 8,249,885 B2 * | 8/2012 | Berkowitz et al. | 705/1.1 |
| 8,364,655 B2 | 1/2013 | Hom et al. | |
| 2003/0093583 A1 | 5/2003 | Doran et al. | |
| 2005/0044103 A1 | 2/2005 | MacLeod et al. | |

(Continued)

OTHER PUBLICATIONS

Pandya, U.S. Appl. No. 12/893,453, Office Action dated Apr. 19, 2012, 22 pages.

(Continued)

*Primary Examiner* — Wing F Chan
*Assistant Examiner* — Raji Krishnan
(74) *Attorney, Agent, or Firm* — John R. Pivnichny; Maxine L. Barasch; Keohane & D'Alessandro PLLC

(57) ABSTRACT

The invention is directed to just-in-time (JIT) retrieval of directory information to reduce network traffic and load on directory servers and/or data sources by requesting only the information that is currently needed from the directory server. In the invention, a wrapper operating with a directory server and an application programming interface (API) provides this capability. The wrapper is configured to receive a request from a client and to determine a location corresponding to a set of current attribute values for responding to the request. The wrapper retrieves the set of current attribute values in a JIT manner from at least one of the following: the directory server and an external source. A set of current attributes is returned to the client from the wrapper. By propagating information in a JIT manner, only the information that will be currently used is propagated across the network.

11 Claims, 6 Drawing Sheets

(56) References Cited

U.S. PATENT DOCUMENTS

| | | | |
|---|---|---|---|
| 2005/0216485 A1* | 9/2005 | Bell et al. | 707/100 |
| 2006/0080352 A1* | 4/2006 | Boubez et al. | 707/102 |
| 2006/0179140 A1 | 8/2006 | John et al. | |
| 2008/0040395 A1 | 2/2008 | Danoyan | |
| 2008/0040550 A1* | 2/2008 | Lindner | 711/130 |
| 2008/0046655 A1* | 2/2008 | Bhanoo et al. | 711/133 |
| 2008/0126309 A1 | 5/2008 | Rowley | |
| 2008/0133712 A1 | 6/2008 | Friedman et al. | |
| 2008/0209040 A1* | 8/2008 | Rathi | 709/226 |
| 2009/0049200 A1* | 2/2009 | Lin et al. | 709/246 |
| 2009/0063417 A1 | 3/2009 | Kinder | |
| 2009/0183246 A1* | 7/2009 | Kokologiannakis | 726/7 |
| 2009/0276483 A1* | 11/2009 | Lind et al. | 709/201 |
| 2010/0234022 A1* | 9/2010 | Winterbottom | 455/433 |
| 2011/0264865 A1* | 10/2011 | Mobarak et al. | 711/141 |
| 2012/0078862 A1 | 3/2012 | Hom et al. | |
| 2012/0078947 A1 | 3/2012 | Hom et al. | |

OTHER PUBLICATIONS

Pandya, U.S. Appl. No. 12/893,453, Office Action dated Sep. 4, 2012, 22 pages.
Pandya, U.S. Appl. No. 12/893,453, Office Action dated Nov. 21, 2012, 24 pages.
Pandya, U.S. Appl. No. 12/893,453, Office Action dated May 10, 2013, 44 pages.
Pandya, U.S. Appl. No. 12/893,453, Office Action dated Aug. 22, 2013, 50 pages.
Pandya, U.S. Appl. No. 12/893,453, Office Action dated Mar. 3, 2014, 53 pages.
Pandya, U.S. Appl. No. 12/893,453, Examiners Answer dated Oct. 24, 2014, 7 pages.
Pandya, U.S. Appl. No. 12/893,468, Office Action dated May 3, 2012, 30 pages.
Pandya, U.S. Appl. No. 12/893,468, Notice of Allowance dated Sep. 27, 2012, 17 pages.

* cited by examiner

JUST-IN-TIME WRAPPER SYNCHRONIZATION

This invention was made with U.S. Government support under contract No. USJFCOM CRADA #07-10 awarded by the U.S. Department of Defense (DOD). The U.S. Government has certain rights in this invention.

CROSS-REFERENCE TO RELATED APPLICATIONS

This application is related in some aspects to the commonly owned and co-pending application entitled "INTEGRATED JUST-IN-TIME SYNCHRONIZATION," filed Sep. 29, 2010, and commonly owned and co-pending application entitled "HYBRID JUST-IN-TIME INTEGRATION," filed Sep. 29, 2010, the entire contents of which are herein incorporated by reference.

FIELD OF THE INVENTION

This invention relates generally to server directory integration, and more specifically, to just-in-time (JIT) directory integration.

BACKGROUND OF THE INVENTION

Today, people and businesses rely on networked computer systems to support distributed applications. As the number of different networks and applications has grown, the number of specialized directories of information has also grown, resulting in islands of information that are difficult to share and manage. Maintaining and accessing this information in a consistent and controlled manner provides a focal point for integrating a distributed environment into a consistent and seamless system.

The Lightweight Directory Access Protocol (LDAP) is an open industry standard that has evolved to meet these needs. LDAP is based on the client/server model of distributed computing and defines a standard method for accessing and updating information in a directory. In computer terms, a directory is a specialized database, also called a data repository, that stores typed and ordered information about objects. LDAP has gained wide acceptance as the directory access method of the Internet and is therefore also becoming strategic within enterprise intranets. It is being supported by a growing number of software vendors and is being incorporated into a growing number of applications. However, current solutions propagate data and information too frequently, resulting in unnecessarily large databases and data transfers. Existing directory integration methods fetch data before it is requested. A large batch of data is retrieved from the data sources, while the data in the directory is replaced. Any subsequent changes to the sources are also changed in the directory. Because it is not determined which information will be needed in the future by the client, all of the data is propagated.

SUMMARY OF THE INVENTION

In one embodiment, there is a method for just-in-time (JIT) retrieval of directory information. In this embodiment, the method comprises: providing a directory server operating with an application programming interface (API) and a wrapper; sending a request from a client to the wrapper; receiving the request from the client at the wrapper; determining, by the wrapper, a location corresponding to a set of current attribute values for responding to the request; retrieving the set of current attribute values from at least one of the following: the directory server, and an external source.

In a second embodiment, there is a directory apparatus for just-in-time (JIT) retrieval of directory information, the directory apparatus comprising a directory server operating with an application programming interface (API) and a wrapper, which is configured to: receive a request from a client at the wrapper; determine a location corresponding to a set of current attribute values for responding to the request; retrieve the set of current attribute values from at least one of the following: the directory server, and an external source; and return a set of current attributes to the client from the wrapper.

In a third embodiment, there is a computer-readable medium storing computer instructions, which when executed, enables a computer system operating with a directory server, an application programming interface (API), and a wrapper to provide just-in-time (JIT) retrieval of directory information. In this embodiment, the computer instructions comprise: receiving a request from a client at the wrapper; determining, by the wrapper, a location corresponding to a set of current attribute values for responding to the request; retrieving the set of current attribute values in a JIT manner from at least one of the following: the directory server, and an external source; and returning a set of current attributes to the client from the wrapper.

In a fourth embodiment, there is a method for deploying a wrapper for use in a computer system to provide just-in-time (JIT) retrieval of directory information. In this embodiment, a computer infrastructure is provided and is operable to: receive a request from a client at the wrapper; determine a location corresponding to a set of current attribute values in a JIT manner for responding to the request; retrieve the set of current attribute values from at least one of the following: the directory server, and an external source; and return a set of current attributes to the client from the wrapper.

Figure 1:
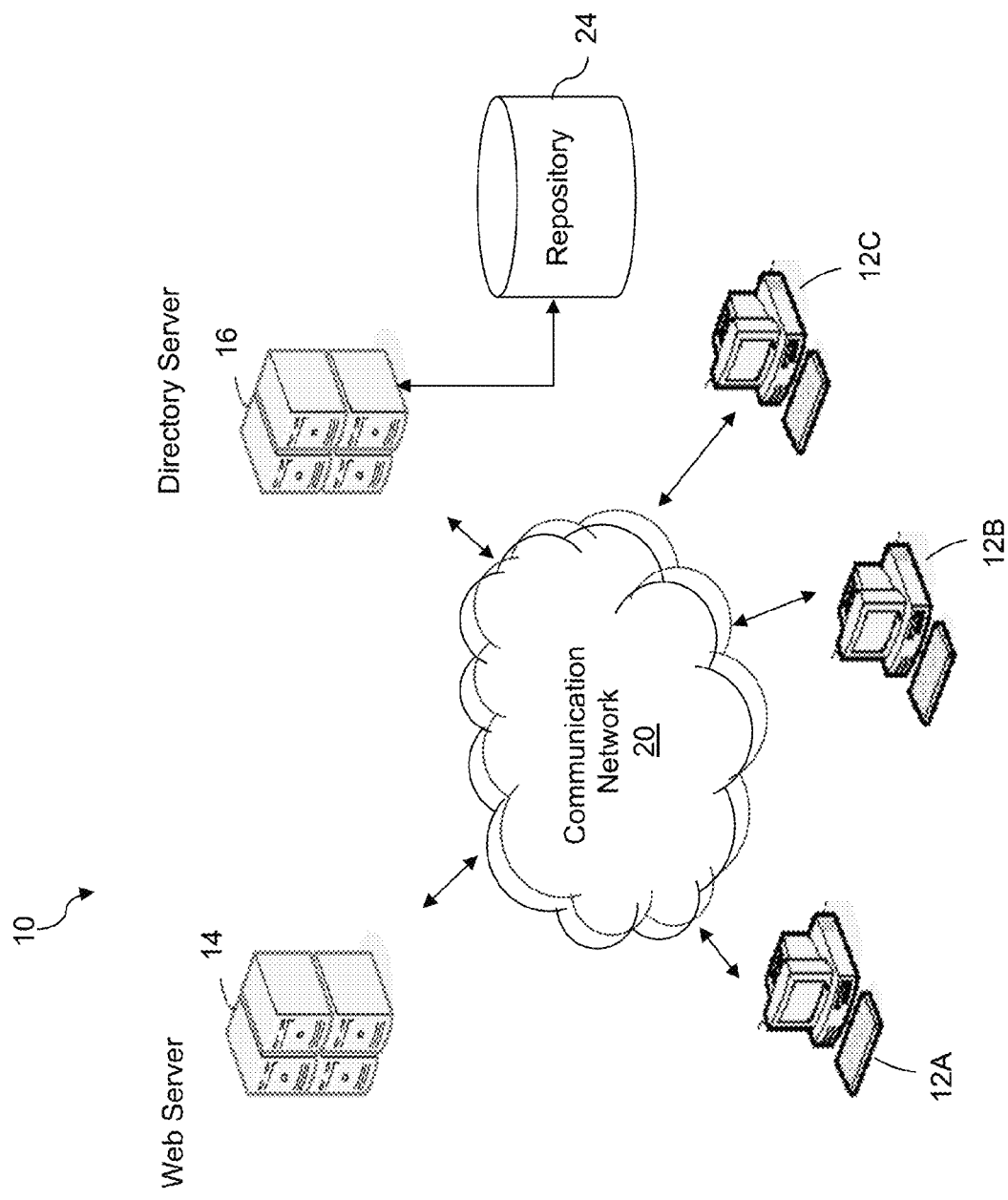
FIG. 1 illustrates a network architecture including a communication link between network-connected clients and a directory server according to embodiments of the invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. For example, embodiments of the invention are described in the context of Lightweight Directory Access Protocol (LDAP). It will be appreciated, however, that the invention applies to any directory interface, including, but not limited to LDAP. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus appearances of the phrases "in one embodiment," "in an embodiment," "in embodiments" and similar language throughout this specification may, but do not necessarily, all refer to the same embodiment.

Embodiments of this invention are directed to JIT retrieval of directory information to reduce network traffic and load on directory servers and/or data sources by requesting only the information that is currently needed from the directory server. In these embodiments, a wrapper operating with the directory server and an application programming interface (API) provides this capability. Specifically, the wrapper is configured to receive a request from a client and to determine a location corresponding to a set (i.e., one or more) of current attribute values for responding to the request. The wrapper retrieves the set of current attribute values in a JIT manner from at least one of the following: the directory server and an external source. A set of current attributes is returned to the client from the wrapper. The wrapper propagates information in a JIT manner so that only the information that will be currently used is propagated across the network.

FIG. 1 illustrates network architecture 10 including a communication link between network-connected clients and a directory server (e.g., a LDAP directory server) according to one embodiment of this invention. As shown, network architecture 10 may include clients 12A, 12B, 12C coupled with a web server 14 (or a set of web servers) and directory server 16 (or a set of directory servers) via a communication network 20 (e.g., a public network such as the Internet or a private network such as a local area network (LAN)). Clients 12A, 12B, 12C may be, for example, server devices for Enterprise Service Bus, Policy Decision Points, Policy Enforcement Points, personal computers (PCs), mobile phones, palm-sized computing devices, personal digital assistants (PDAs), etc.

Communication network 20 may be described in a simplified manner as a collection of computer systems (e.g., clients and servers) that are interconnected by transmission lines (or wireless transmissions) and routers/switches to enable the transfer of information among them, as illustrated in FIG. 1. These computer systems are often modeled by their functions: client-server. In the client-server model, communication generally takes the form of a request from the client to the server asking for an operation to be performed (e.g., request for data). The server performs the work and sends a reply. Client 12 may then retrieve and display the requested information. However, a computer system may operate as both a server and a client.

Client-server systems communicate with each other using a variety of network protocols, such as Transmission Control Protocol/Internet Protocol (TCP/IP) and Integrated Packet Exchange (IPX), and a variety of application protocols, such as Hypertext Transfer Protocol (HTTP) and File Transfer Protocol (FTP). A user typically views the network as a collection of web pages that are typically located on a server at a network site. Each web page may contain text, embedded components such as graphic image files, and address links to other pages referred to as a Uniform Resource Locator (URL). Web pages are viewed using a program called a web browser that resides on a user's client device. The web browser retrieves information from a requested page on a server, interprets the data and formatting commands, and displays the text and special accessory files, such as images, on the user's client device. Web pages may be created using Hypertext Markup Language (HTML) with hypertext and other information to be displayed in a web browser.

Directory server 16 operates with a repository 24, which may be a directory of data entries containing LDAP information, and may be stored in directory server 16. Upon receiving a request for information from any of the clients 12A, 12B, 12C, the request may be sent to and received directly by directory server 16. Alternatively, web server 14 retrieves data from directory server 16, which in turn retrieves data from its associated repository 24.

LDAP is a networking protocol for querying and modifying directory services running over TCP/IP. Repository 24 may contain a tree of data entries, each of which comprises a collection of attributes that contain information about an object. Every attribute has a type and one or more values. The type of the attribute is associated with the syntax, which specifies the kind of values the can be stored (e.g., cn (common name), sn (surname), givenName, mail, uid, and userPassword). Schemas define the type of objects that can be stored in the directory. Schemas also list the attributes of each object type and whether these attributes are required or optional. Repository 24 may be any type of recordable media including but not limited to DASD (direct access storage device), floppy disk, CD ROM, DVD, semiconductor memory, or magnetic tape along with a drive or other apparatus for accessing data in the directory entries. Repository 24 may be either rewritable media, or read-only. If read-only then the directory entries have to be placed on the media by some process other than use of the drive or apparatus used for access.

Attributes within repository 24 will often have different names and syntaxes in source and target systems. Some attribute values for a target system don't have a direct mapping and may have to be computed from values in one or more source systems, for example, as when first name, middle initial, and last name in a system are combined to create a cn (common name) attribute in repository 24. However, attribute mapping rules can be much more complex. For example, the users in LDAP repositories can be organized into a hierarchical directory tree with a distinguished name (DN) that specifies the precise location of their entry in the tree. When groups are synchronized between directories with different tree structures the groups contain the DNs of users in a member attribute. The DNs have to be mapped between the tree structures as the group entries are copied or synchronized between the directories. As discussed in further detail below, repository 24 maintains both internal values and attribute values from other sources (e.g., external sources), as well as information on how to retrieve these external values, and how long they can be used.

Figure 2:
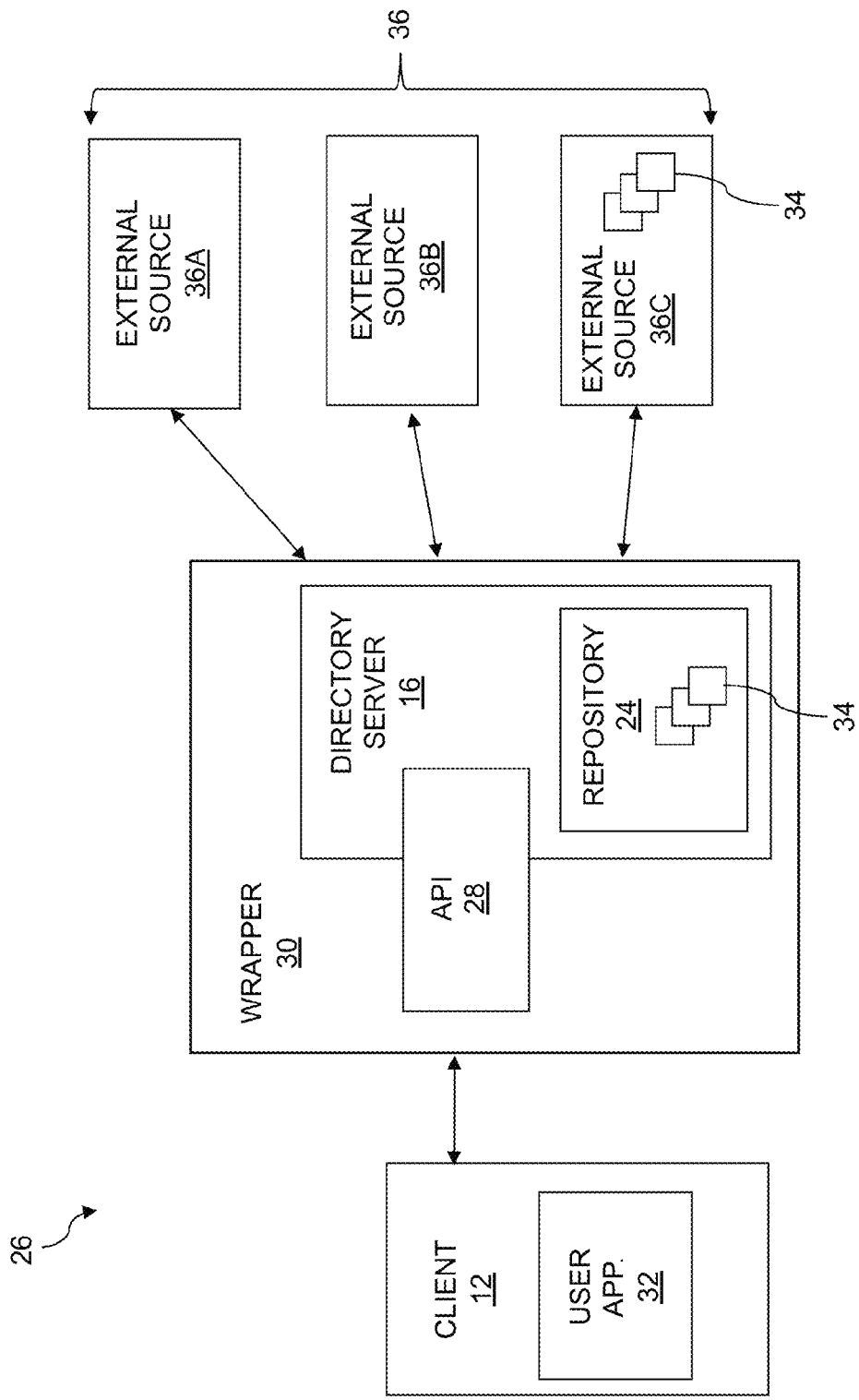
FIG. 2 shows a more detailed view of a directory apparatus for JIT retrieval of directory information that operates in the environment shown in FIG. 1 according to embodiments of the invention.

Referring now to FIG. 2, a directory apparatus 26 for JIT retrieval of LDAP information (i.e., data) that operates in the environment shown in FIG. 1 is described in more detail. Directory apparatus 26 comprises directory server 16 and repository 24 operating with an application programming interface (API) 28 and a wrapper 30. Repository 24 is accessed using the client/server model of communication. In the embodiment shown, an application that wants to read or write information in repository 24 does not access it directly. Instead, it calls a function or API 28 that causes a message to be sent to another process. This second process accesses the information in repository 24 on behalf of the requesting application via TCP/IP.

Directory server 16 is coupled to wrapper 30, which is adapted to interface with a user application 32 on client 12. Wrapper 30, as used herein, is defined as software code, a program module(s), application program(s), etc., which takes lower level information and makes it usable at a higher level. For example, wrapper 30 is capable of changing the structure or format of LDAP information within LDAP repository 16 without modifying user application 32. Wrapper 30 adheres to the interface of repository 24 and adds integration functionality without changing the repository itself. Furthermore, wrapper 30 does nothing until a request is received from client 12. Instead, wrapper 30 integrates only when a request is made, so that only the data requested is fetched. Once a request is made user application 32 interfaces with wrapper 30 instead of directly to repository 24.

Figure 3:
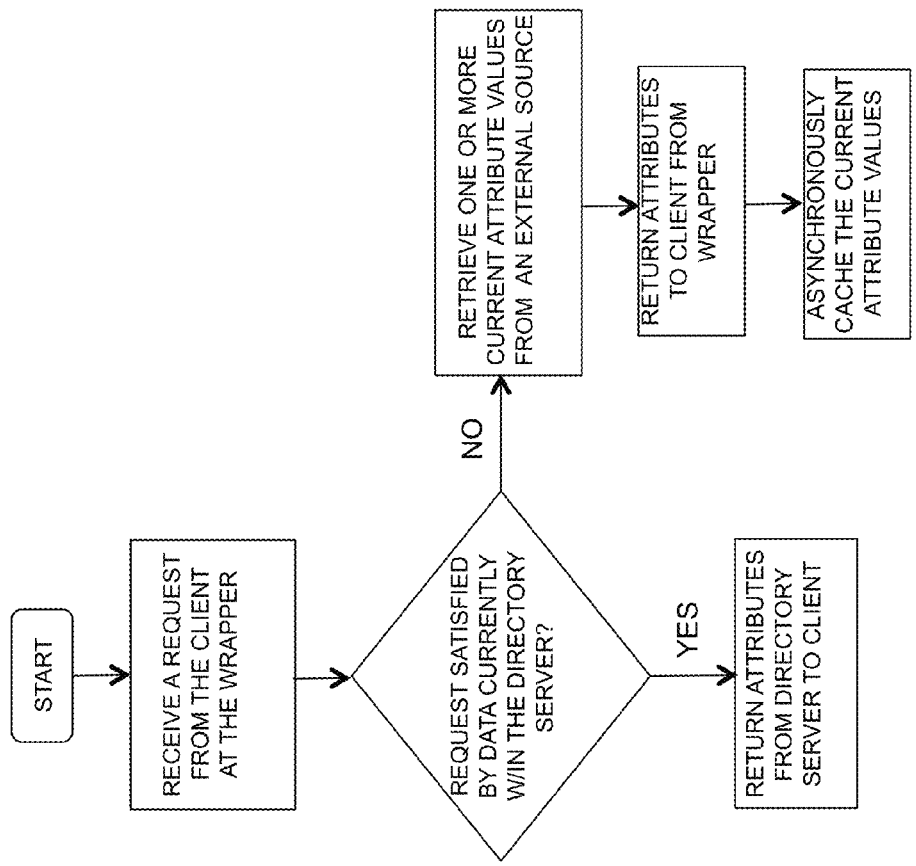
FIG. 3 shows a flow diagram of a method for JIT retrieval of directory information according to embodiments of the invention.

During operation, as shown in FIGS. 2-3, user application 32 sends a query or request from client 12 across a path towards directory server 16, where the request is received at wrapper 30. Wrapper 30 intercepts the request before it reaches directory server 16 and determines a location corresponding to a set of current attribute values 34 for responding to the request. This location, shown here within directory server 16 and an external source 36C for exemplary purposes only, depends on whether the request can be satisfied by data currently within directory server 16. As used herein, a current attribute value is an attribute value that has been updated within a determined period of time to ensure that the information is sufficiently up-to-date. Once the location is determined, wrapper 30 is configured to retrieve set of current attribute values 34 (asynchronously or synchronously) from at least one of the following: directory server 16, and an external source 36 (e.g., an LDAP provider). To accomplish this, API 28 accepts the request from wrapper 30, and forwards it to repository 24. If the request can be satisfied by data currently within directory server 16, then the current attribute value(s) is returned to client 12 from wrapper 30, thus reducing network traffic and load on external sources 36. However, in the case that the request cannot be satisfied by data currently within directory server 16 (e.g., an attribute value is stale), at least one of set of current attribute values 34 is asynchronously retrieved from external sources 36A, 36B, and/or 36C.

Figure 4:
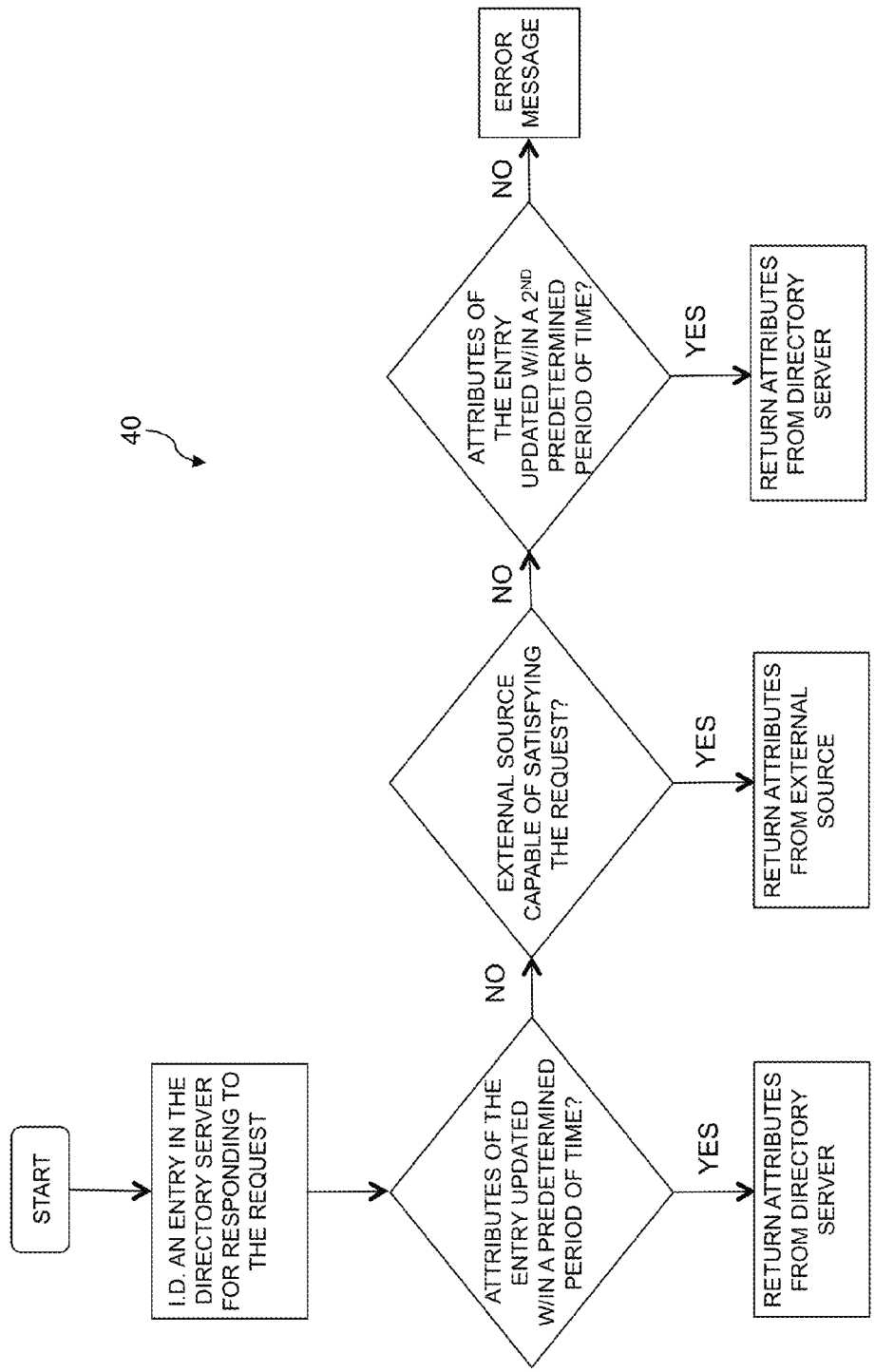
FIG. 4 shows a flow diagram of a method for determining whether a client request can be satisfied by data currently within the directory server according to embodiments of the invention.

As discussed above, when a request is sent from client 12, directory server 16 attempts to first retrieve the attributes internally. Wrapper 30 determines whether the request can be satisfied by data currently within directory server 16, as shown in the process flow 40 of FIG. 4. In a first step, an entry in directory server 16 is identified for responding to the request. If the entry is found, wrapper 30 determines whether one or more attributes of the entry in directory server 16 have been updated within a predetermined period of time. To accomplish this, a refresh/date cached value stored in wrapper 30 for the attribute values is checked against a predetermined refresh date to determine if the data is stale and must be refreshed. If the data must be refreshed, the request from client 12 is not capable of being satisfied solely by directory server 16, and data needs to come from external source 36. Wrapper 30 maps (i.e., determines) the location corresponding to set of current attributes 34 for responding to the request from one or more external sources 36A, 36B, or 36C (FIG. 2).

Next, it must be determined whether external sources 36 can satisfy the request in the case that one or more attributes of the entry in directory server 16 have not been updated within a predetermined period of time. If external source 36 is unable to satisfy the request (i.e., the location cannot be mapped), wrapper 30 determines whether the one or more attributes of the entry in directory server 16 have been updated within a second predetermined period of time in the case that external source 36 is unable to satisfy the request. For example, if the identity (i.e., distinguished name) cannot be mapped, then the refresh/date cached value stored in wrapper 30 for the attributes is again checked against a second, typically less preferable predetermined refresh date to determine if the values in repository 24 may still be used. If the attribute values are acceptable, the request for the attributes is passed on to directory server 16. However, if the attribute values are not current within the first or second predetermined periods of time, and external sources 36A-36C are unavailable, then the request cannot be satisfied and an error message is returned to client 12. In one embodiment, wrapper 30 may determine that the attribute values may be returned even if stale beyond the first and second predetermined periods of time. In yet another embodiment, repository 24 may be preloaded if the identity cannot be mapped by wrapper 30.

Once set of current attribute values 34 is located and a set of current attributes (i.e., attributes containing current attribute values) is subsequently returned from wrapper 30 to client 12, wrapper 30 asynchronously caches the set of current attribute values in repository 24 and updates a refresh value for each of set of current attribute values 34. The refresh value represents the date and time that the attribute values were cached in repository 24, as well as how long they can be used before becoming stale. The refresh and staleness limits may be specified by an administrator. Caching the attributes in repository 24 reduces network traffic and load on external sources 36, and provides a redundant source in case any of external sources 36 fail.

Figure 5:
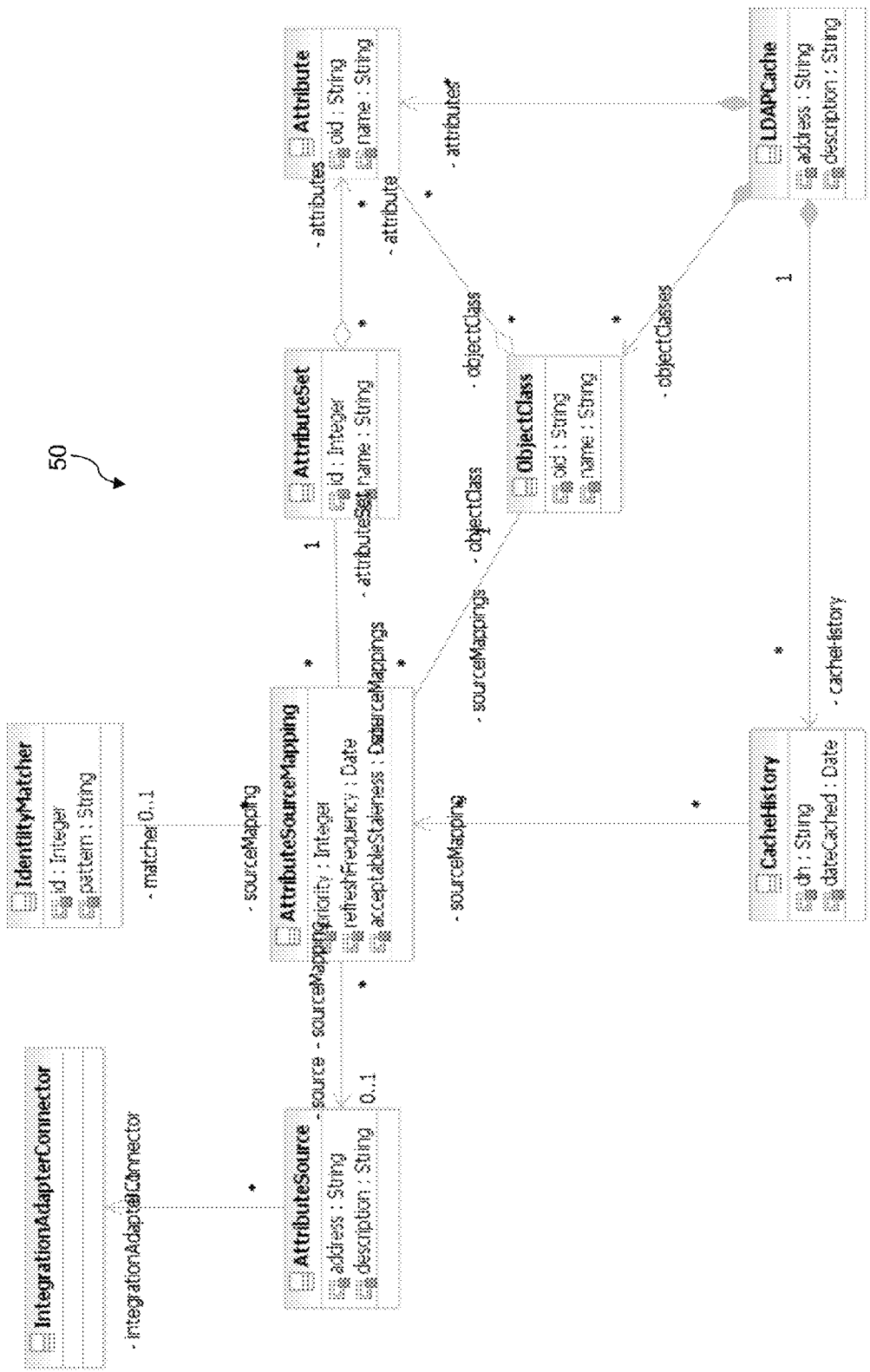
FIG. 5 shows a structure for mapping attribute sources according to an embodiment of the invention.

As discussed above, repository 24 maintains both internal attribute values and attribute values from external sources, as well as information on how to retrieve these external values and how long they can be used. Referring now to FIG. 5, a structure 50 for mapping attribute sources according to an embodiment of the invention will be described in greater detail. Initially, wrapper 30 (FIG. 2) checks to see if there are instance records in the CacheHistory for the requested instance, which is queried by DN. If records are found, structure 50 finds corresponding AttributeSourceMapping for each CacheHistory. Next, structure 50 evaluates whether AttributeSourceMapping.refreshFrequency+

CacheHistory.dateCached<SYSTEMDATE. If the expression evaluates to true, then the data is not stale and may be used. If the expression evaluates to false, the data is stale and should be refreshed. Structure 50 then compares the names (or OIDs) in the incoming request to the names (or OIDs) in the corresponding Attribute (via AttributeSet). Structure 50 returns all of the names (or OIDs) of attributes that are not stale and in the list of attributes to be requested.

If some of the data is not current, structure 50 checks to see if there are instance records in the CacheHistory for the requested instance (queried by DN). If records are found, structure 50 finds corresponding AttributeSourceMapping for each CacheHistory and evaluates whether the AttributeSourceMapping.refreshFrequency+
CacheHistory.dateCached<SYSTEMDATE. If the expression evaluates to true, then the data is not stale and may be used. If the expression evaluates to false, the data is stale and should be refreshed. Structure 50 then compares the names (or OIDs) in the incoming request to the names (or OIDs) in the corresponding Attribute (via AttributeSet). Structure 50 returns AttributeMaps for all of the names and locations (or OIDs) of attributes that are stale and in the list of attributes to be requested. These AttributeMaps represent a set of attributes that must be retrieved from a remote system. The AttributeMaps have a remote address and multiple attributes, including the key to retrieve the values.

After the current attribute values are located and subsequently returned from the wrapper to the client, structure 50 invokes a AttributeMap.updateRefreshDates method, which updates the corresponding CacheHistory with a date determined by wrapper 30. Wrapper 30 updates the data in repository 24 via directory server 16.

In still another embodiment, the methodologies disclosed herein can be used within a computer system to provide JIT propagation of directory information. In this case, one or more systems for performing the processes described in the invention can be obtained and deployed to a computer infrastructure. To this extent, the deployment can comprise one or more of (1) installing program code on a computing device, such as a computer system, from a computer-readable medium (e.g., a transitory computer-readable medium, or a non-transitory computer readable medium); (2) adding one or more computing devices to the infrastructure; and (3) incorporating and/or modifying one or more existing systems of the infrastructure to enable the infrastructure to perform the process actions of the invention.

Figure 6:
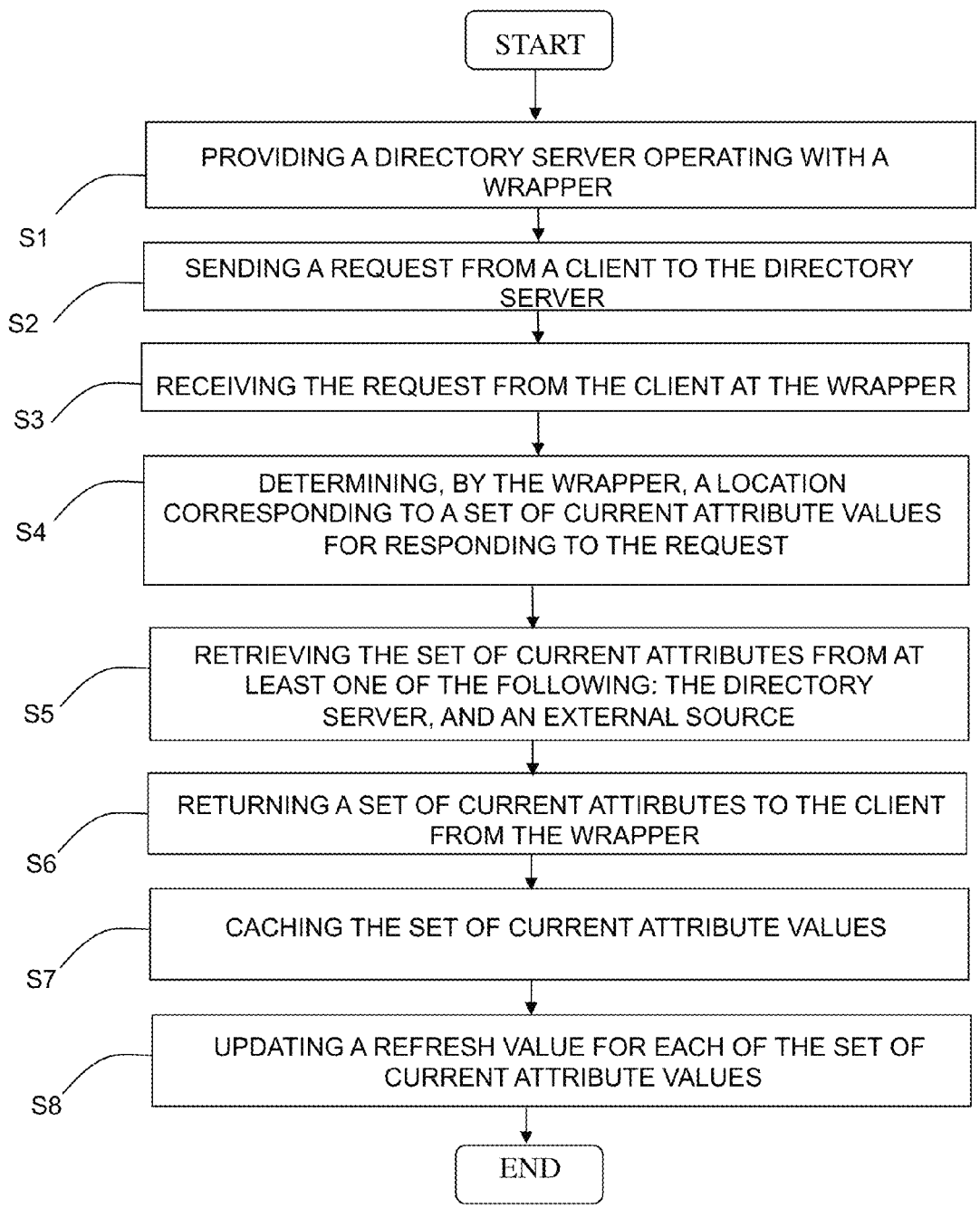
FIG. 6 shows a flow diagram of a method for retrieving directory information according to embodiments of the invention.

Furthermore, one or more program modules may carry out the methodologies disclosed herein, as shown in FIG. 6. According to one embodiment, in step S1, a directory server operating with a wrapper is provided. In S2, a request is sent from a client to the server and received at the wrapper in S3. In S4, the location corresponding to a set of current attribute values for responding to the request is determined by the wrapper. In S5, the set of current attribute values is retrieved from at least one of the following: the directory server, and an external source. In S6, a set of current attribute values is returned to the client from the wrapper. In S7, a set of current attributes is asynchronously cached. In S8, a refresh value for each of the set of current attribute values is updated. The flowchart of FIG. 6 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

An implementation of a computer for carrying out the invention may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for just-in-time (JIT) retrieval of directory information. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for just-in-time (JIT) retrieval of directory information, the method comprising:
providing a directory server and a repository, the directory server operating with an application programming interface (API) and a wrapper, wherein the repository is a cache capable of receiving refreshed attributes from an external source, and wherein the external source comprises a lightweight directory application protocol (LDAP) provider;
intercepting, by the wrapper, a request made from a client application intended for the directory server, wherein the wrapper integrates with the repository only when the request is made, and wherein following the making of the request, the client application interfaces with the wrapper instead of the repository;
identifying by the wrapper a set of attribute values of an entry in the repository for responding to the request;

determining by the wrapper, a location corresponding to the set of attribute values for responding to the request, wherein the determining the location comprises:
  evaluating whether the set of attribute values have been refreshed in the repository within a first predetermined period of time;
  in the case that the set of attribute values have been refreshed in the repository within the first predetermined period of time, determining, based on the evaluation, the repository as the location corresponding to the set of attribute values;
  in the case that the set of attribute values in the repository have not been refreshed within the first predetermined period of time, determining whether the external source can satisfy the request, and determining the external source as the location corresponding to the set of attribute values, based on the determination that the external source can satisfy the request;
  in the case that the external source is unable to satisfy the request, determining whether the set of attribute values in the repository have been refreshed within a second predetermined period of time, and determining the repository as the location corresponding to the set of attribute values, based on the determination that the set of attribute values in the repository have been refreshed within the second predetermined period of time;
retrieving the set of attributes values from the determined location and responding to the request;
updating the repository by caching the set of attribute values in the repository and associating a refresh date with the set of attribute values as determined by the wrapper, in the case that the set of attribute values is retrieved from the external source.

2. The method according to claim 1, further comprising:
returning the set of attributes to the client from the wrapper;
asynchronously caching the set of attribute values in the repository; and
updating the refresh date for each of the set of attribute values.

3. The method according to claim 1, further comprising preloading the repository.

4. A directory apparatus for just-in-time (JIT) retrieval of directory information, comprising:
  a processor; and
  a memory storing computer readable instructions, which when executed by the processor, configure the directory apparatus to provide
  a directory server,
  an application programming interface (API),
  a wrapper and
  a repository,
  wherein the repository is capable of receiving refreshed attributes from an external source, wherein the external source comprises a lightweight directory application protocol (LDAP) provider,
  wherein the wrapper is configured to:
    intercept a request made from a client application intended for the directory server, wherein the wrapper integrates with the repository only when the request is made, and wherein following the making of the request, the client application interfaces with the wrapper instead of the repository;
    identify a set of attribute values of an entry in the repository for responding to the request;
    determine a location corresponding to the set of attribute values for responding to the request, wherein the determining the location comprises:
      evaluating whether the set of attribute values have been refreshed in the repository within a first predetermined period of time;
      in the case that the set of attribute values have been refreshed in the repository within the first predetermined period of time, determining, based on the evaluation, the repository as the location corresponding to the set of attribute values;
      in the case that the set of attribute values in the repository have not been refreshed within the first predetermined period of time, determining whether the external source can satisfy the request, and determining the external source as the location corresponding to the set of attribute values, based on the determination that the external source can satisfy the request;
      in the case that the external source is unable to satisfy the request, determining whether the set of attribute values in the repository have been refreshed within a second predetermined period of time, and determining the repository as the location corresponding to the set of attribute values, based on the determination that the set of attribute values in the repository have been refreshed within the second predetermined period of time;
    retrieve the set of attribute values from the determined location and responding to the request;
    update the repository by caching the set of attribute values in the repository and associating a refresh date with the set of attribute values as determined by the wrapper, in the case that the set of attribute values is retrieved from the external source.

5. The directory apparatus according to claim 4, wherein the wrapper is further configured for asynchronously caching the set of attribute values and updating the refresh date for each of the set of attribute values.

6. The directory apparatus according to claim 4, further comprising preloading the repository.

7. A non-transitory computer-readable medium storing computer instructions, which when executed, enables a computer system operating with a directory server, an application programming interface (API), and a wrapper, to provide just-in-time (JIT) retrieval of directory information, the computer instructions comprising:
  providing a repository with the directory server, wherein the repository is a cache capable of receiving refreshed attributes from an external source, and wherein the external source comprises a lightweight directory application protocol (LDAP) provider;
  intercepting, by the wrapper, a request made from a client application intended for the directory server, wherein the wrapper integrates with the repository only when the request is made, and wherein following the making of the request, the client application interfaces with the wrapper instead of the repository;
  identifying, by the wrapper, a set of attribute values of an entry in the repository for responding to the request;
  determining, by the wrapper, a location corresponding to the set of attribute values for responding to the request, wherein the determining the location comprises:
    evaluating whether the set of attribute values have been refreshed in the repository within a first predetermined period of time;

in the case that the set of attribute values have been refreshed in the repository within the first predetermined period of time, determining, based on the evaluation, the repository as the location corresponding to the set of attribute values;

in the case that the set of attribute values in the repository have not been refreshed within the first predetermined period of time, determining whether the external source can satisfy the request, and determining the external source as the location corresponding to the set of attribute values, based on the determination that the external source can satisfy the request;

in the case that the external source is unable to satisfy the request, determining whether the set of attribute values in the repository have been refreshed within a second predetermined period of time, and determining the repository as the location corresponding to the set of attribute values, based on the determination that the set of attribute values in the repository have been refreshed within the second predetermined period of time;

retrieving the set of attributes values from the determined location and responding to the request;

updating the repository by caching the set of attribute values in the repository and associating a refresh date with the set of attribute values as determined by the wrapper, in the case that the set of attribute values is retrieved from the external source.

8. The non-transitory computer-readable medium according to claim 7, further comprising computer instructions for:
returning the set of attributes to the client from the wrapper;
asynchronously caching the set of attribute values in the repository; and
updating the refresh date for each of the set of attribute values.

9. The non-transitory computer-readable medium according to claim 7, further comprising computer instructions for preloading the repository.

10. A method for deploying a wrapper for use in a computer system to provide just-in-time (JIT) retrieval of directory information, comprising:
providing a computer infrastructure operating with a directory server, an application programming interface (API), a wrapper, and a repository, wherein the repository is a cache capable of receiving refreshed attributes from an external source, and wherein the external source comprises a lightweight directory application protocol (LDAP) provider;

intercepting, by the wrapper, a request made from a client application intended for the directory server, wherein the wrapper integrates with the repository only when the request is made, and wherein following the making of the request, the client application interfaces with the wrapper instead of the repository;

identifying, by the wrapper, a set of attribute values of an entry in the repository for responding to the request;

determining, by the wrapper, a location corresponding to the set of attribute values for responding to the request, wherein the determining the location comprises:
 evaluating whether the set of attribute values have been refreshed in the repository within a first predetermined period of time;
 in the case that the set of attribute values have been refreshed in the repository within the first predetermined period of time, determining, based on the evaluation, the repository as the location corresponding to the set of attribute values;
 in the case that the set of attribute values in the repository have not been refreshed within the first predetermined period of time, determining whether the external source can satisfy the request, and determining the external source as the location corresponding to the set of attribute values, based on the determination that the external source can satisfy the request;
 in the case that the external source is unable to satisfy the request, determining whether the set of attribute values in the repository have been refreshed within a second predetermined period of time, and determining the repository as the location corresponding to the set of attribute values, based on the determination that the set of attribute values in the repository have been refreshed within the second predetermined period of time;

retrieving the set of attributes values from the determined location and responding to the request;

updating the repository by caching the set of attribute values in the repository and associating a refresh date with the set of attribute values as determined by the wrapper, in the case that the set of attribute values is retrieved from the external source.

11. The method according to claim 10, the computer infrastructure further operable to asynchronously cache the set of attribute values and update the refresh date for each of the set of attribute values.

* * * * *